United States Patent
Rothschild

(10) Patent No.: US 12,061,156 B2
(45) Date of Patent: Aug. 13, 2024

(54) ROTATIONAL X-RAY INSPECTION SYSTEM AND METHOD

(71) Applicant: Viken Detection Corporation, Burlington, MA (US)

(72) Inventor: Peter J. Rothschild, Newton, MA (US)

(73) Assignee: Viken Detection Corporation, Burlington, MA (US)

( * ) Notice: Subject to any disclaimer, the term of this patent is extended or adjusted under 35 U.S.C. 154(b) by 0 days.

(21) Appl. No.: 18/488,676

(22) Filed: Oct. 17, 2023

(65) Prior Publication Data

US 2024/0044812 A1 Feb. 8, 2024

Related U.S. Application Data

(63) Continuation of application No. PCT/US2023/063683, filed on Mar. 3, 2023.

(Continued)

(51) Int. Cl.
  *G01N 23/046* (2018.01)
  *G01N 23/083* (2018.01)
(Continued)

(52) U.S. Cl.
  CPC ......... *G01N 23/046* (2013.01); *G01N 23/083* (2013.01); *G01N 23/10* (2013.01);
(Continued)

(58) Field of Classification Search
None
See application file for complete search history.

(56) References Cited

U.S. PATENT DOCUMENTS

| | | | |
|---|---|---|---|
| 5,642,393 A * | 6/1997 | Krug | G01V 5/0016 378/53 |
| 6,687,328 B2 * | 2/2004 | Bavendiek | G01N 23/04 378/208 |

(Continued)

FOREIGN PATENT DOCUMENTS

| | | | |
|---|---|---|---|
| JP | H05133909 A | * | 5/1993 |
| KR | 20150126556 A | * | 11/2015 |

(Continued)

OTHER PUBLICATIONS

European Patent Office, International Search Report and Written Opinion issued in PCT application No. PCT/US2023/063683, dated Jun. 12, 2023, 12 pages.

*Primary Examiner* — Thomas R Artman
(74) *Attorney, Agent, or Firm* — Sunstein LLP

(57) ABSTRACT

A system for inspecting an object includes a turntable on which the object may be placed. The turntable rotates the object about a first rotation axis. The system also includes an X-ray source to generate an X-ray beam in a plane to intersect with the object. The system also includes an X-ray detector that can detect at least a portion of the X-ray beam transmitted through the object during rotation and generate image data based on the detected X-ray beam. Also included is a controller that can: generate an image of the object based on the image data; determine, based on a suspect item identified in the image of the object, a second rotation axis at an angle from the first axis; cause a tilt of the turntable so that it is perpendicular to the second axis; and initiate a subsequent rotation of the object about the second axis.

29 Claims, 19 Drawing Sheets

Related U.S. Application Data

(60) Provisional application No. 63/316,940, filed on Mar. 4, 2022.

(51) Int. Cl.
*G01N 23/10* (2018.01)
*G01N 23/20* (2018.01)
*G01N 23/203* (2006.01)
*G01V 5/22* (2024.01)

(52) U.S. Cl.
CPC ..... *G01N 23/20083* (2013.01); *G01N 23/203* (2013.01); *G01V 5/22* (2024.01); *G01V 5/232* (2024.01); *G01N 2223/045* (2013.01); *G01N 2223/053* (2013.01); *G01N 2223/1016* (2013.01); *G01N 2223/306* (2013.01); *G01N 2223/3301* (2013.01); *G01N 2223/3306* (2013.01); *G01N 2223/3307* (2013.01); *G01N 2223/3308* (2013.01); *G01N 2223/401* (2013.01); *G01N 2223/419* (2013.01); *G01N 2223/421* (2013.01); *G01N 2223/501* (2013.01); *G01N 2223/639* (2013.01)

(56) References Cited

U.S. PATENT DOCUMENTS

| | | | | |
|---|---|---|---|---|
| 6,707,877 B2* | 3/2004 | Bohn | .................... | G01N 23/044 269/903 |
| 7,099,432 B2* | 8/2006 | Ichihara | ............... | G01N 23/046 378/208 |
| 7,356,115 B2* | 4/2008 | Ford | .................... | G01V 5/005 378/57 |
| 8,000,436 B2* | 8/2011 | Seppi | .................... | G01N 23/046 378/57 |
| 8,137,976 B2* | 3/2012 | Bjorkholm | ............. | G01N 23/04 436/57 |
| 8,551,785 B2* | 10/2013 | Bjorkholm | ............. | G01N 23/04 422/91 |
| 9,341,546 B2* | 5/2016 | Stuke | .................... | G01N 23/04 |
| 2003/0039332 A1 | 2/2003 | Bavendiek et al. | | |
| 2003/0058993 A1* | 3/2003 | Bohn | .................... | G01N 23/044 378/68 |
| 2004/0109532 A1* | 6/2004 | Ford | .................... | G01N 23/046 378/57 |
| 2005/0074088 A1* | 4/2005 | Ichihara | ............... | G01N 23/046 378/58 |
| 2008/0014643 A1* | 1/2008 | Bjorkholm | ............. | G01N 23/04 436/57 |
| 2009/0067575 A1 | 3/2009 | Seppi et al. | | |
| 2009/0274268 A1 | 11/2009 | Grodzins | | |
| 2012/0045033 A1 | 2/2012 | Stuke et al. | | |
| 2012/0177175 A1 | 7/2012 | Bjorkholm | | |
| 2024/0044812 A1* | 2/2024 | Rothschild | ........... | G01N 23/203 |
| 2024/0077638 A1* | 3/2024 | Rothschild | ............... | G01V 5/22 |

FOREIGN PATENT DOCUMENTS

| | | | | |
|---|---|---|---|---|
| KR | 20170005781 A | * | 1/2017 | |
| WO | WO-03085416 A2 | * | 10/2003 | .......... G01M 17/013 |
| WO | WO-2023168407 A1 | * | 9/2023 | |

* cited by examiner

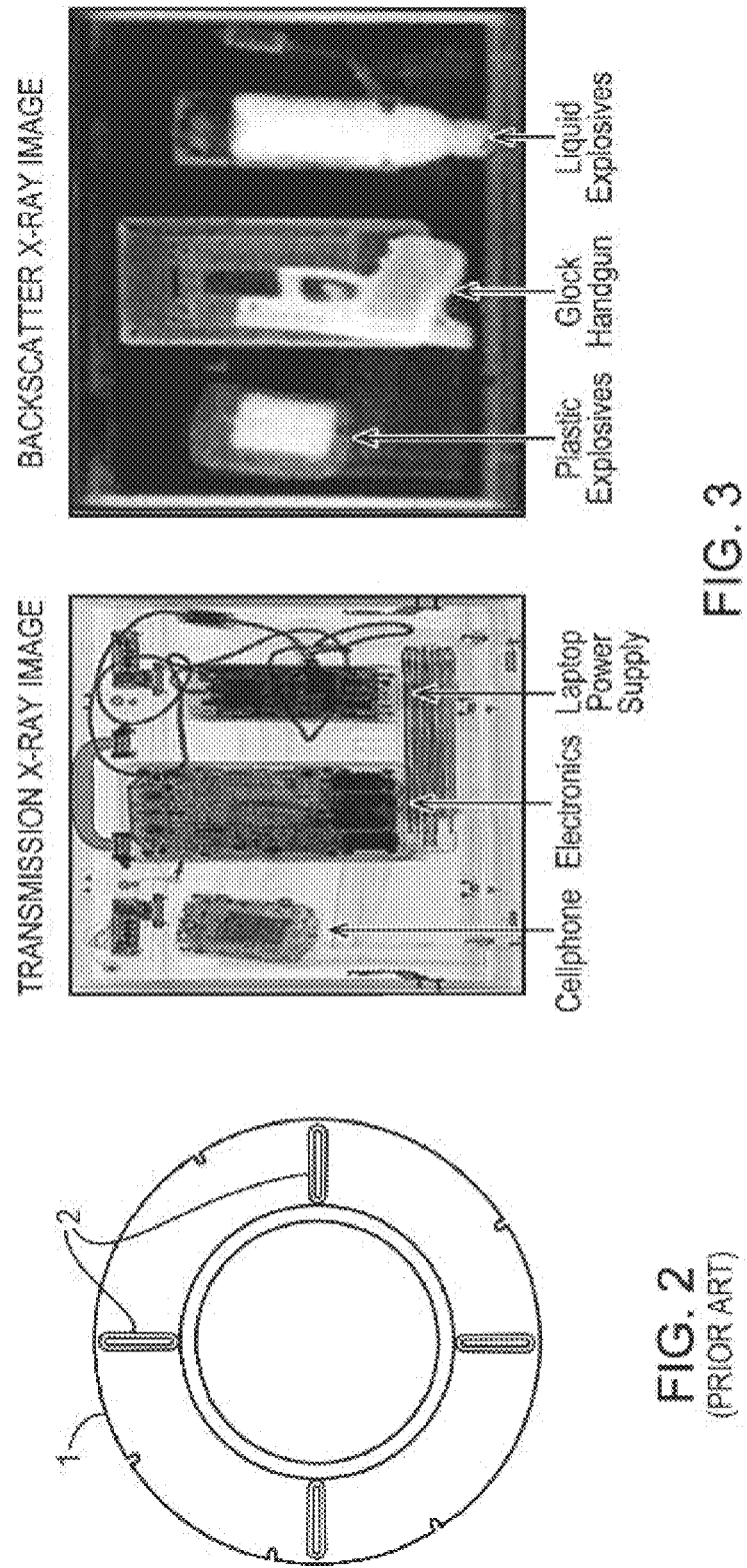

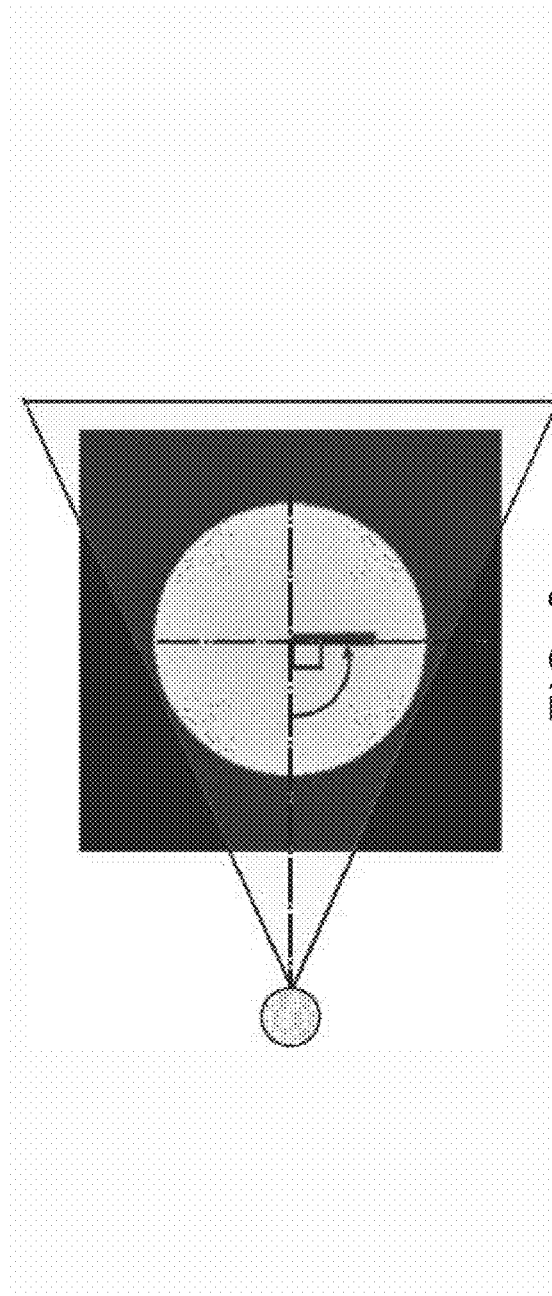
FIG. 9
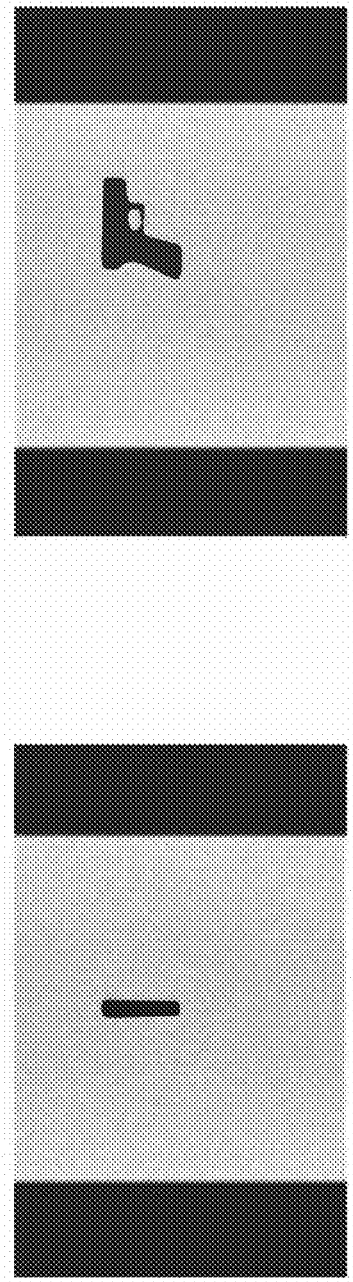
FIG. 10A
FIG. 10B

GUN LYING FLAT IN ROTATION PLANE
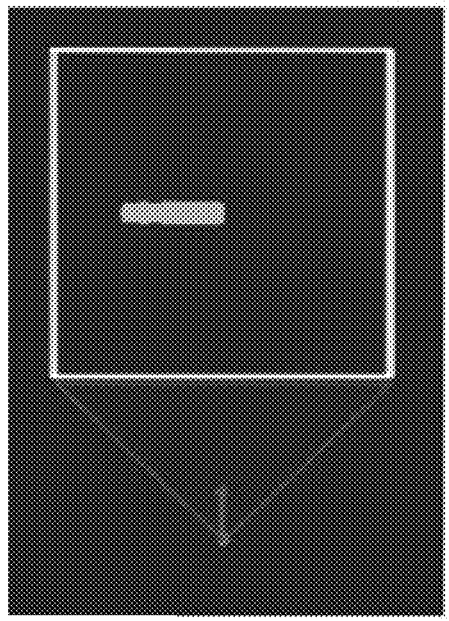
GUN IDENTIFIED
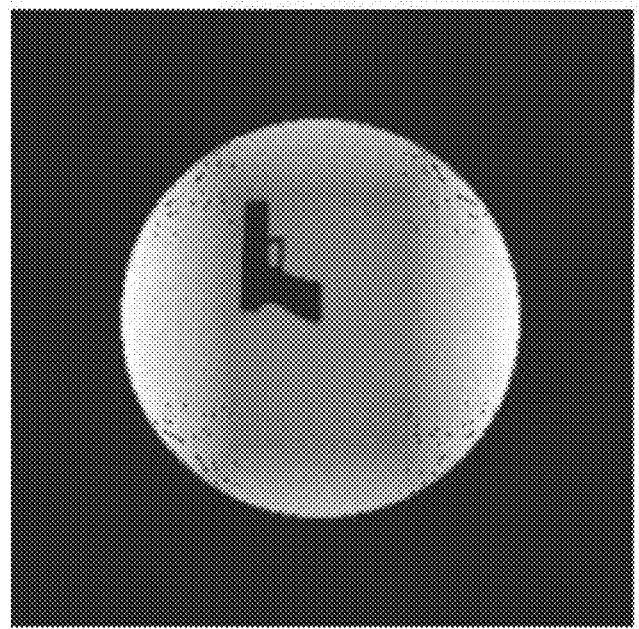
FIG. 18A

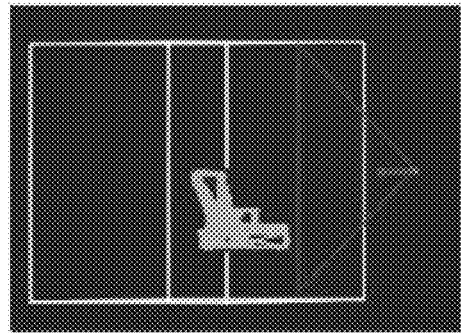
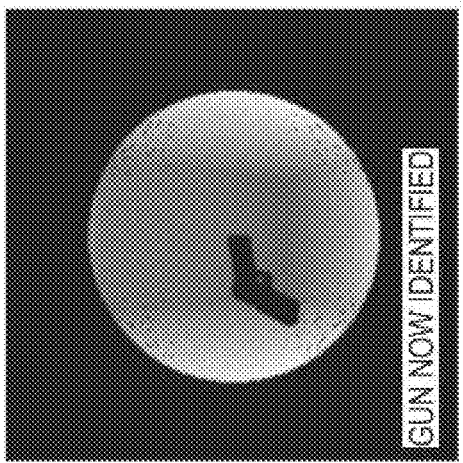
FIG. 18C
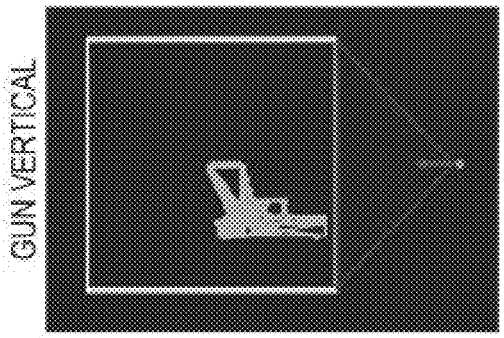
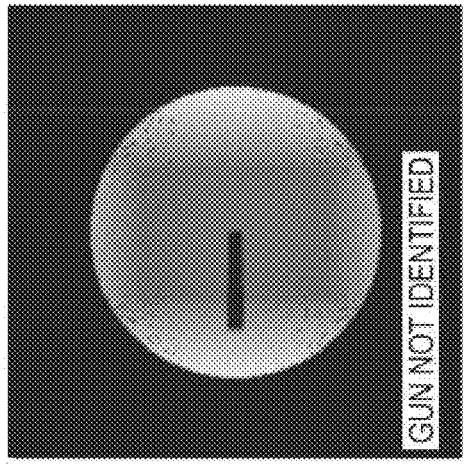
FIG. 18B

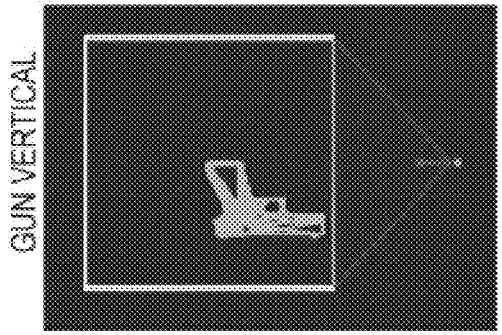
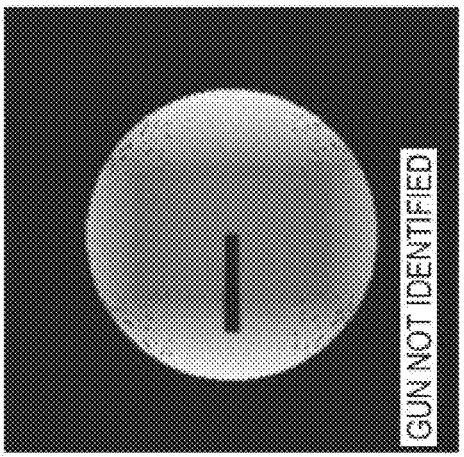
FIG. 18D
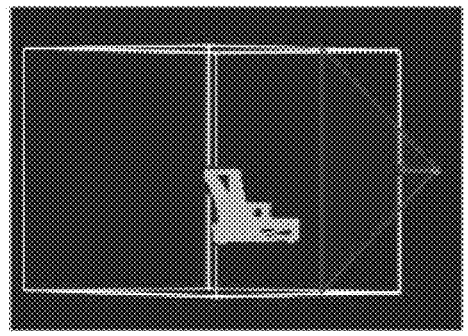
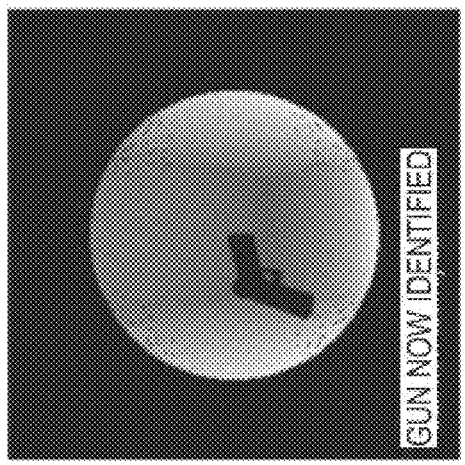
FIG. 18E

ROTATIONAL X-RAY INSPECTION SYSTEM AND METHOD

RELATED APPLICATION

This application is a continuation of PCT Application No. PCT/US2023/063683, filed on Mar. 3, 2023, which claims the benefit of U.S. Provisional Application No. 63/316,940, filed on Mar. 4, 2022. The entire teachings of the above application are incorporated herein by reference.

BACKGROUND

X-ray imaging has been used for detecting concealed contraband, such as drugs, explosives, and weapons, since such systems were first deployed in the 1970s. Typical transmission imaging systems for baggage used a fan beam of X-rays to illuminate the object being inspected, as it is translated linearly through the system on a conveyor. A linear array of X-ray detecting elements then records the intensity of the X-rays transmitted through the object at each point in the fan beam, enabling one line of the transmission image to be obtained. By acquiring many lines of transmission data as the object is translated linearly through the fan beam, a full two-dimensional transmission image of the object is acquired.

SUMMARY

Example embodiments include a system for inspecting an object by rotating the object in the system, rather than by translating the object throught the system. The system may include a turntable, an X-ray source, an X-ray detector, and a controller. The turntable may be configured to rotate the object about a substantially vertical axis. The X-ray source may be configured to generate an X-ray beam in a substantially vertical plane. The X-ray detector may be configured to detect at least a portion of the X-ray beam transmitted through the object during rotation and generate image data based on the detected X-ray beam. The controller may be configured to generate an image of the object based on the image data.

The X-ray beam may be a fan beam, and the X-ray detector may include a segmented detector array configured to detect the portion of the X-ray beam. Alternatively, the X-ray beam may be a sweeping pencil beam, and the X-ray detector may include a non-segmented monolithic detector configured to detect the transmitted portion of the X-ray beam at each point in the beam sweep. The turntable may be configured to rotate the object through at least 180 degrees.

The X-ray source may be a first X-ray source, the X-ray beam may be a first X-ray beam, and the X-ray detector may be a first X-ray detector, and the system may further comprise a second X-ray source and a second X-ray detector. The second X-ray source may be configured to generate a second X-ray beam in a plane substantially orthogonal to the vertical plane, and the second X-ray detector may be configured to detect at least a portion of the second X-ray beam transmitted through the object during rotation. The turntable may be further configured to translate the object vertically as the second X-ray source generates a second X-ray beam. The second X-ray beam may be a fan beam, and the second X-ray detector may include a segmented detector array configured to detect the transmitted portion of the second X-ray beam. Alternatively, the second X-ray beam may be a sweeping pencil beam, and the second X-ray detector may include a non-segmented monolithic detector configured to detect the transmitted portion of the second X-ray beam.

Following detection of the portion of the first X-ray beam and prior to generation of the second X-ray beam, the controller may be further configured to determine a degree of rotation of the object based on the image of the object. The controller may be configured to determine the degree of rotation based on a suspect item detected within the image of the object. The controller may be configured to determine the degree of rotation based on a target angle to obtain a side view of a suspect item, such as a gun or other weapon, within the object.

The system may further include at least one backscatter detector configured to detect scattered radiation from the X-ray beam. The turntable may be substantially transparent to X-rays. The controller may be configured to translate the turntable along a substantially vertical direction. The transmitted X-rays from the X-ray beam may be detected during both rotation and translation of the object. The controller may be further configured to reconstruct contents of the object via at least one Computerized Tomography (CT) algorithm.

The controller may be further configured to 1) identify a suspect region of the image, and 2) confine a subsequent scan of the object to a subset of the object including the suspect region. The controller may be further configured to identify the suspect region based on a backscatter image of the object. The controller may be further configured to 1) cause the turntable to tilt away from a position perpendicular to the vertical axis, and 2) initiate a subsequent scan of the object wherein the X-ray generator generates a subsequent X-ray beam through the object. The controller may determine an angle for the tilt based on a suspect item identified in the image of the object. The controller may also generate the image of the object by mapping the image data onto rectilinear coordinates.

The vertical axis may be a first rotation axis, and the top surface of the turntable may be tilted away from the vertical axis and be orthogonal to a second rotational axis. The controller may rotate the object about the second axis and cause the X-ray detector to obtain subsequent image data of the object.

Further embodiments include a method of inspecting an object. The object may be rotated about a substantially vertical axis. An X-ray beam may be generated in a substantially vertical plane through the object. A portion of the X-ray beam may be transmitted through the object during rotation of the object. Image data may be generated based on the detected portion of the X-ray beam. The image data may then be mapped onto rectilinear coordinates to generate an image of the object.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2 is a diagram of a disk chopper wheel for use in a prior-art X-ray backscatter imaging system.

FIG. 3 are transmission (left) and backscatter (right) images of a small briefcase acquired simultaneously with a sweeping X-ray beam in a prior art system.

FIG. 9. Rotation of the inspected object that produced the image of FIG. 7 to allow for an optimal viewing angle in the side-view.

FIG. 10A is a side view image of a handgun acquired without optimally rotating the inspected object.

FIG. 10B is a side view image of the handgun acquired after optimally rotating the inspected object through the angle shown in FIG. 9.

FIGS. 18A-E are images of a suspect item obtained by the system of FIGS. 17A-B in one embodiment.

DETAILED DESCRIPTION

A description of example embodiments follows. The teachings of all patents, published applications and references cited herein are incorporated by reference in their entirety.

In the late 1970s, an alternate method of creating transmission images was developed at American Science & Engineering (AS&E) that used sweeping beams of X-rays. A rotating "chopper wheel" illuminated with an incident fan beam of X-rays creates a sweeping "pencil beam" of X-rays as the wheel rotates. The intensity of the transmitted X-ray beam at each point during the sweep is measured (typically every few microseconds) using a single monolithic non-segmented transmission detector on the far side of the object, which is sufficiently long to intercept the transmitted beam over the entire sweep. As the object being scanned is translated linearly through the plane of the sweeping beam (typically on a conveyor belt), a two-dimensional transmission image of the object is created. The major advantage of this technique is that a non-segmented transmission detector can be used, which is much simpler and often cheaper than a segmented detector array used for fan-beam transmission imaging. Another advantage, particularly advantageous for certain disclosed embodiments, is that the pencil beam technique produces a much lower radiation dose to the environment and to the object being scanned. This allows the X-ray imaging system to have more of an open-geometry and to contain fewer shielding materials than is required in a system that uses the conventional fan-beam approach.

Figure 1:
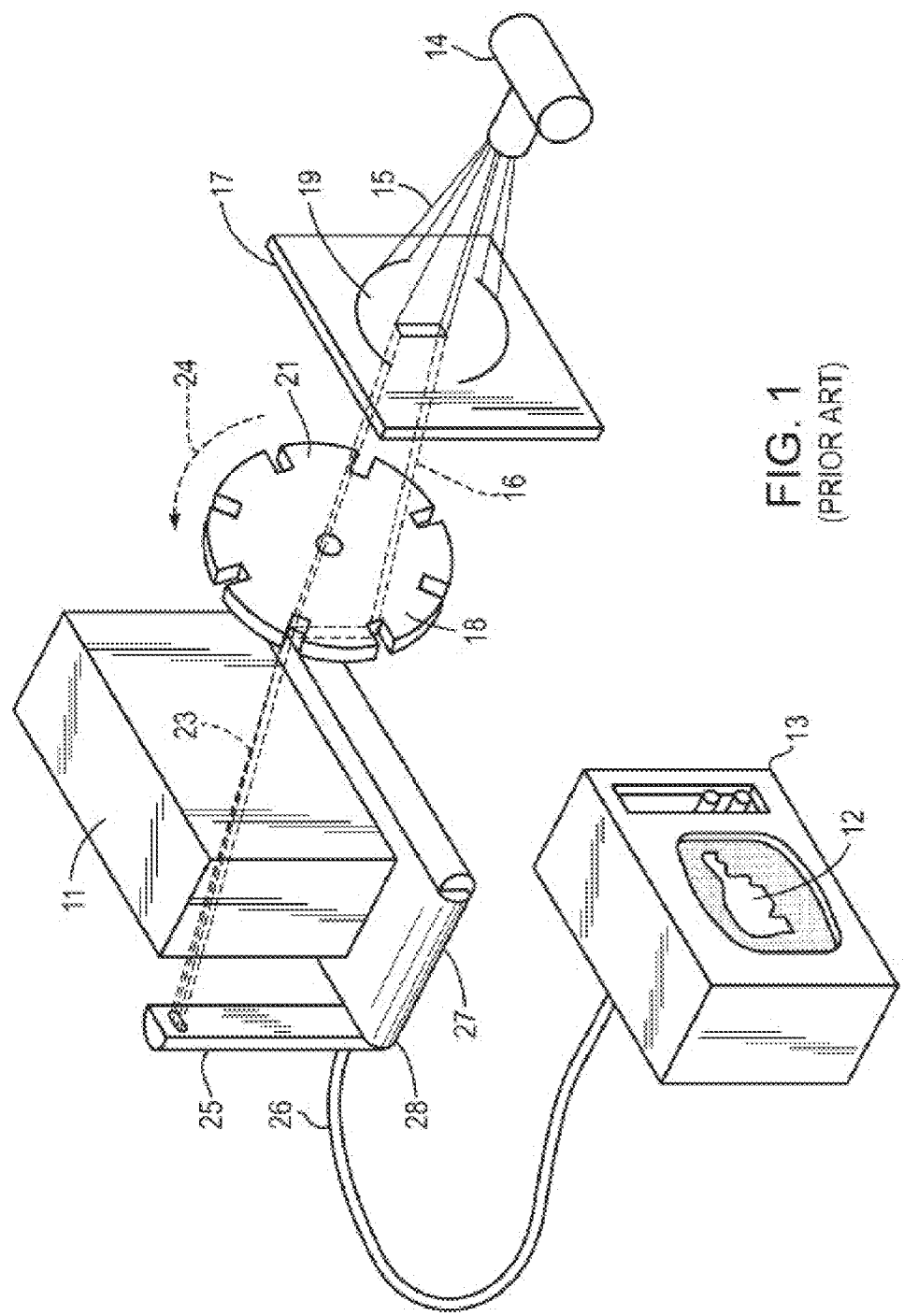
FIG. 1 is a schematic representation of a prior-art X-ray backscatter imaging system.

FIG. 1 illustrates a prior-art X-ray backscatter imaging system, which implements the aforementioned sweeping beam technique to acquire backscatter images. Unlike traditional transmission X-ray imaging that creates images by detecting the X-rays penetrating through an object, backscatter imaging uses reflected or scattered X-rays to create the image. A standard X-ray tube 14 generates the X-rays that are collimated into a fan beam 16 by a slit in attenuating plate 19. The fan beam is then "chopped" into a pencil beam by a rotating "chopper wheel" 18 with slits 21, which scans over the object being imaged as the wheel rotates. The intensity of the X-rays scattered in the backwards direction is then recorded by one or more large-area backscatter detectors (not shown) as a function of the position of the illuminating beam to form a backscatter image. In addition, the intensity of the transmitted X-rays can be recorded by a transmission detector 25 to simultaneously create a transmission X-ray image. By moving the object through the plane containing the scanning beam, either on a conveyor 27 or under its own power, a two-dimensional backscatter image of the object is obtained. Alternately, the object can be stationary, and the imaging system can be moved relative to the object.

FIG. 2 illustrates a chopper wheel that creates the scanning pencil beam used in a handheld backscatter X-ray imaging instrument. It includes a tungsten outer disk 1, typically with an aluminum inner hub, containing one or more radial slits 2. A fan beam of X-rays is incident on the disk, illuminating a strip on one side of the disk. Only one of the radial slits 2 is illuminated at any given time, allowing a beam of X-rays to pass though the slit. As the disk rotates, the beam sweeps across the object being scanned.

FIG. 3 shows a transmission image (left) and a backscatter image (right) of a small briefcase acquired simultaneously with a sweeping X-ray beam in a prior art system. X-ray backscatter imaging has been shown to preferentially favor the detection of highly scattering organic materials which may not be easily visible in a conventional X-ray transmission image. The transmission images, on the other hand, preferentially favor the detection of highly absorbing metallic items such as weapons. By combining the two imaging modalities, metallic and non-metallic threats can be advantageously detected.

Example embodiments described herein include a compact X-ray inspection system for detecting concealed threats in objects such as bags, packages, or other containers. Such embodiments may perform inspections without requiring a conveyor belt, allowing them to take up less room and to be less intrusive. This advantage is especially beneficial in locations where aesthetic considerations are important, such as in hotel, hospital, or museum lobbies. Rather than rely on a linear translation of the inspected object through the X-ray beam, the initial primary scan of the inspected object may involve rotation of the object in the plane of the incident beam.

Figure 4:
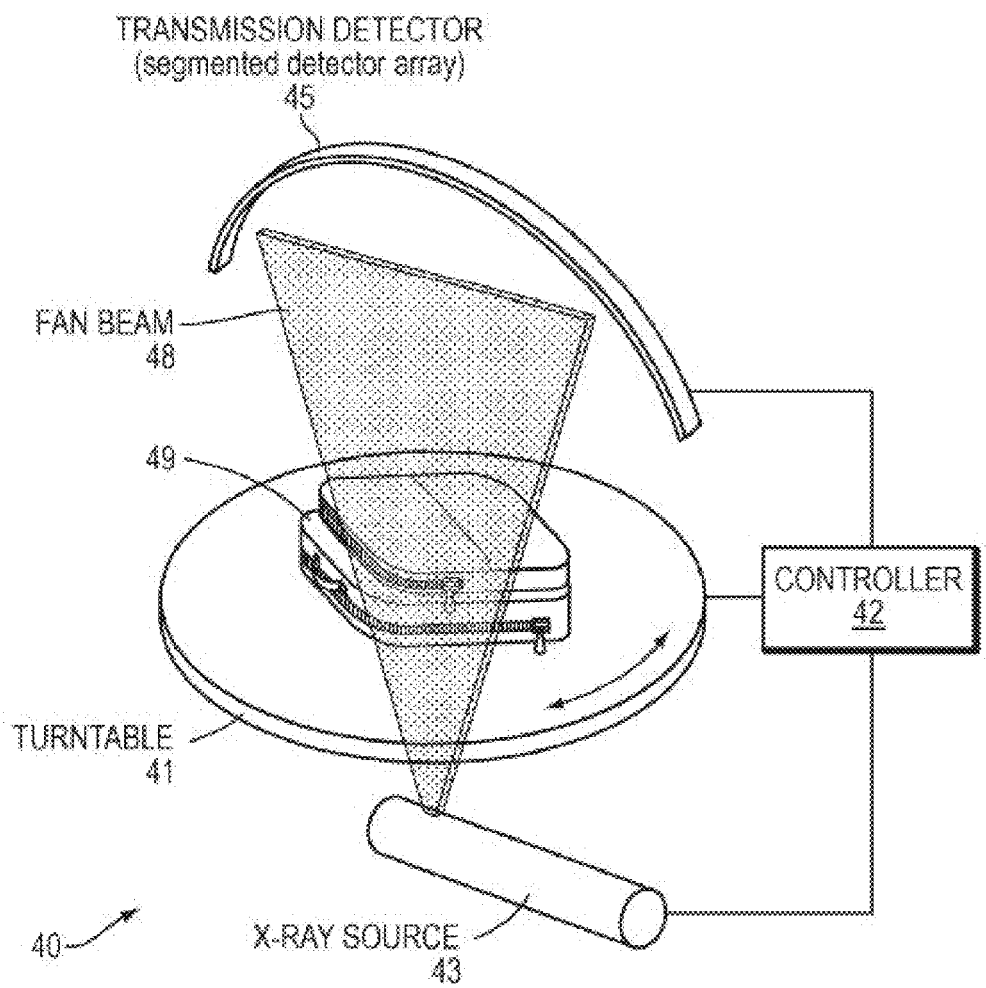
FIG. 4 is a diagram of a single-view detector system that uses a fan beam and segmented transmission detector array in one embodiment.

FIG. 4 is a diagram of a single-view detector system 40 that uses a fan beam and segmented transmission detector array in one embodiment. The system 40 may include a turntable 41, an X-ray source 43, a segmented transmission X-ray detector 45, and a controller 42. The turntable 41 may be any rotation mechanism configured to rotate an object 49 about a substantially vertical axis. The X-ray source 43 may generate an X-ray beam 48 in a substantially vertical plane (e.g., aligned with the vertical axis). The X-ray detector 45 may detect at least a portion of the X-ray beam transmitted through the object 49 during rotation and generate image data based on the detected X-ray beam. The controller 42 may then generate an image of the object based on the image data.

Figure 5:
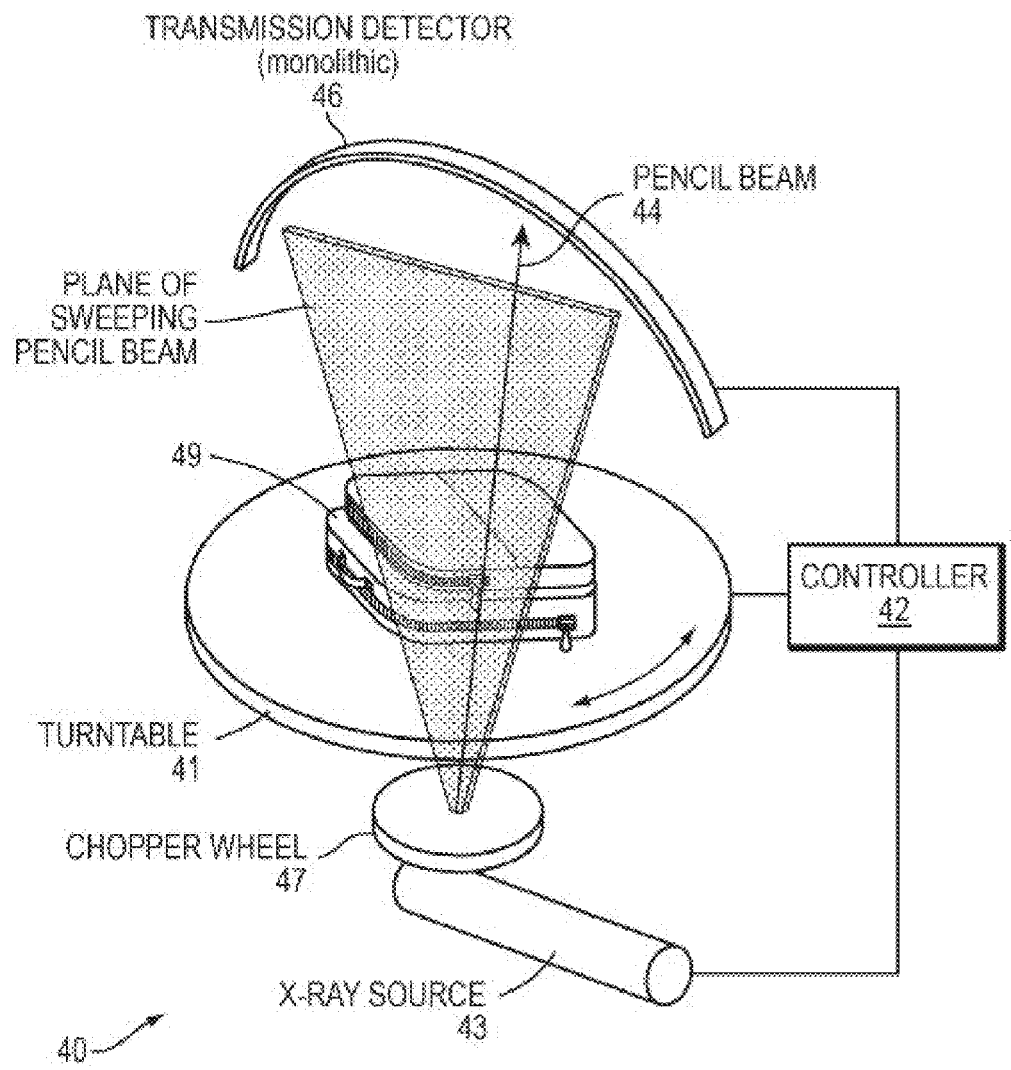
FIG. 5 is a diagram of a single-view detector system that uses a sweeping pencil beam and monolithic transmission detector array in one embodiment.

FIG. 5 is a diagram of a single-view detector system 50 that uses a sweeping pencil beam 44 and monolithic transmission detector array 46 in one embodiment. The system 50 may be configured comparably to the system 40 of FIG. 4, including the aforementioned turntable 41, X-ray source 43, segmented transmission X-ray detector 45, and controller 42. The system 50 further includes a chopper wheel 47 that may rotate at the output of the X-ray source 43 to generate the pencil beam 44 and cause the beam 44 to sweep along a plane as shown, at least a portion of the beam 44 passing through the object 49 being scanned.

In both of the systems 40, 50 described above, after the item 49 is placed on the turntable 41, the turntable 41 may rotate the item 49 (e.g., through 180 degrees or more) as it is illuminated with the respective X-ray beam such that a vertical fan beam 48 of X-rays (FIG. 4) or a sweeping beam 44 of X-rays sweeping within a plane in a substantially vertical orientation (FIG. 5), providing full coverage of the bag and its contents in the transmission image.

Figure 6B:
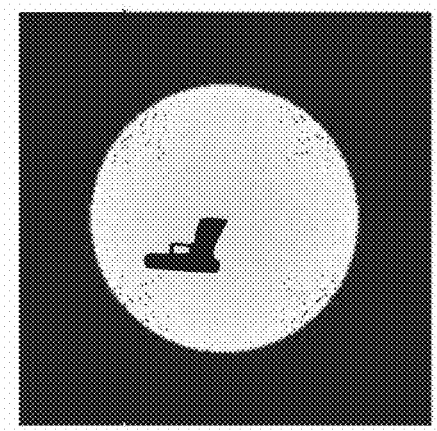
FIG. 6B is the raw image of FIG. 6A remapped onto rectilinear coordinates.
Figure 6A:
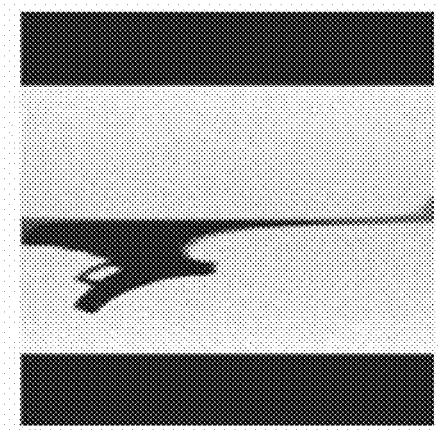
FIG. 6A is a raw image created from a rotational scan of a bag containing a handgun using the system shown in FIG. 5.

FIG. 6A is a raw image created from a rotational scan of a bag containing a handgun using the system 50 described above. FIG. 6B, in contrast, is the raw image of FIG. 6A remapped onto rectilinear coordinates. Because the object 49 is rotated in the beam, rather than translated through the plane of the beam, the scan lines produced in the raw image may be radial rather than rectilinear. In FIG. 6A, the raw image of a gun lying flat in a bag filled with clothing is shown. In this example scan, the bag is rotated through 180 degrees on a turntable, with 360 increments of 0.5 degrees. For each rotational position of the turntable, the X-ray beam sweeps through the bag with 256 individual angular orientations. The resulting raw image of FIG. 6A, containing 360 radial scan lines, each with 256 pixels, may then be remapped onto rectilinear (x,y) coordinates to create a true two-dimensional representation of the bag as shown in FIG. 6B.

Figure 7:
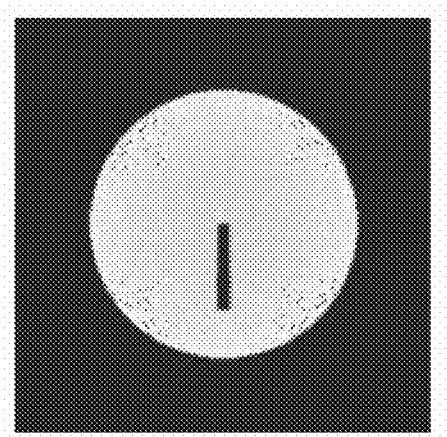
FIG. 7 is the remapped image of a gun lying in the plane of the sweeping beam of the system shown in FIG. 5.

FIG. 7 is a remapped image comparable to that of FIG. 6B. However, in this example, the gun is lying in the plane of the sweeping beam of the system 50. Because the gun in FIG. 6B is lying flat in the bag, in the plane perpendicular to the axis of rotation, it is easily recognizable as a gun in the primary rotational scan. However, if the gun is lying in the plane of the vertical fan beam or the plane of the sweeping pencil beam, then it will appear as shown in the image in FIG. 7. An operator (or AI algorithm operated by the controller 42, for example) examining the image may be unable to determine if it was a gun, or some other more likely rectangular item, such as a laptop power supply or cell phone charger. In order to verify the identity of the item, the bag could be repositioned by an operator and a second rotational scan could be acquired. However, this is time consuming, and slows down the throughput of the inspection checkpoint.

Figure 8:
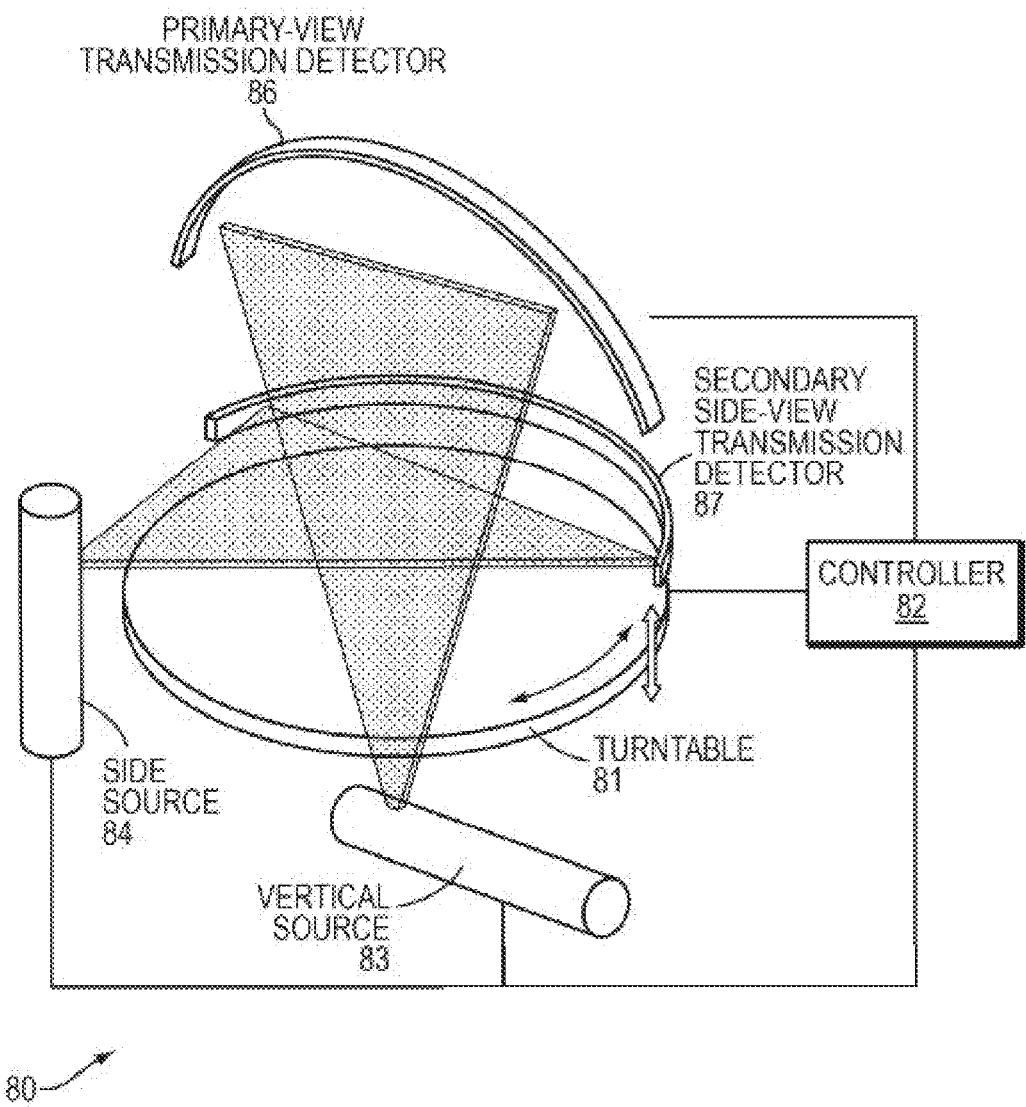
FIG. 8 is a diagram of a dual-view detector system that includes a side-view in one embodiment.

FIG. 8 is a diagram of a dual-view detector system 80 that includes a side-view inspection to further enhance clearance of suspect items. The system 80 may be configured comparably to the systems 40, 50 described above, including a turntable 81, vertical X-ray source 83, transmission X-ray detector 86, and controller 82. The system 80 further includes a second, horizontal X-ray source 84 that generates a fan beam or a sweeping pencil beam oriented in a substantially horizontal plane. The horizontal X-ray source 84 and a corresponding side-view transmission detector 87 may perform a scan of the object at the same or a different time as the scan performed by the vertical X-ray source 83 and detector 86. When performing such a scan, the turntable 81 may be further configured to translate the object being scanned (not shown) in the vertical direction (e.g., by raising and/or lowering the turntable 81) through the plane of the horizontal X-ray beam using a translational actuator (not shown) to produce a standard rectilinear side-view transmission image of the object.

In an example scanning process, if a prior scan region of the primary rotational scan by the vertical source 83 and detector 86 generates an image matching the size, shape, and/or attenuation characteristic of a suspect item such as a gun or other concealed weapon, the controller 82 can automatically directed the system 80 to scan the bag from the side in a determined optimal orientation to determine whether the item is a weapon. For example, the dark rectangular region in FIG. 7 containing the gun can be imaged from the side. As shown in the image of FIG. 9, if the turntable was not rotated to the optimal position and was scanned from the side with the gun in the same orientation shown in FIG. 7, a side-view image would be obtained that would not provide additional useful information for identifying the item as a gun, as shown in FIG. 10A. However, the controller 82 may implement an image analysis process (e.g., a deep learning or other machine learning algorithm) to identify the region in FIG. 7 as potentially representing a gun, and in response, the controller 82 may cause the turntable 81 to rotate 90 degrees such that the long axis of the suspicious rectangular region is rotated through 90 degrees so that the gun is now perpendicular to the centroid of the side-view X-ray beam. The translation side-view scan may then be acquired by lifting the turntable 81, producing the side-view transmission image shown in FIG. 10B. This image clearly indicates the suspicious item is a gun, allowing an automated alarm to be initiated.

Single-View Scanning System

Figure 11:
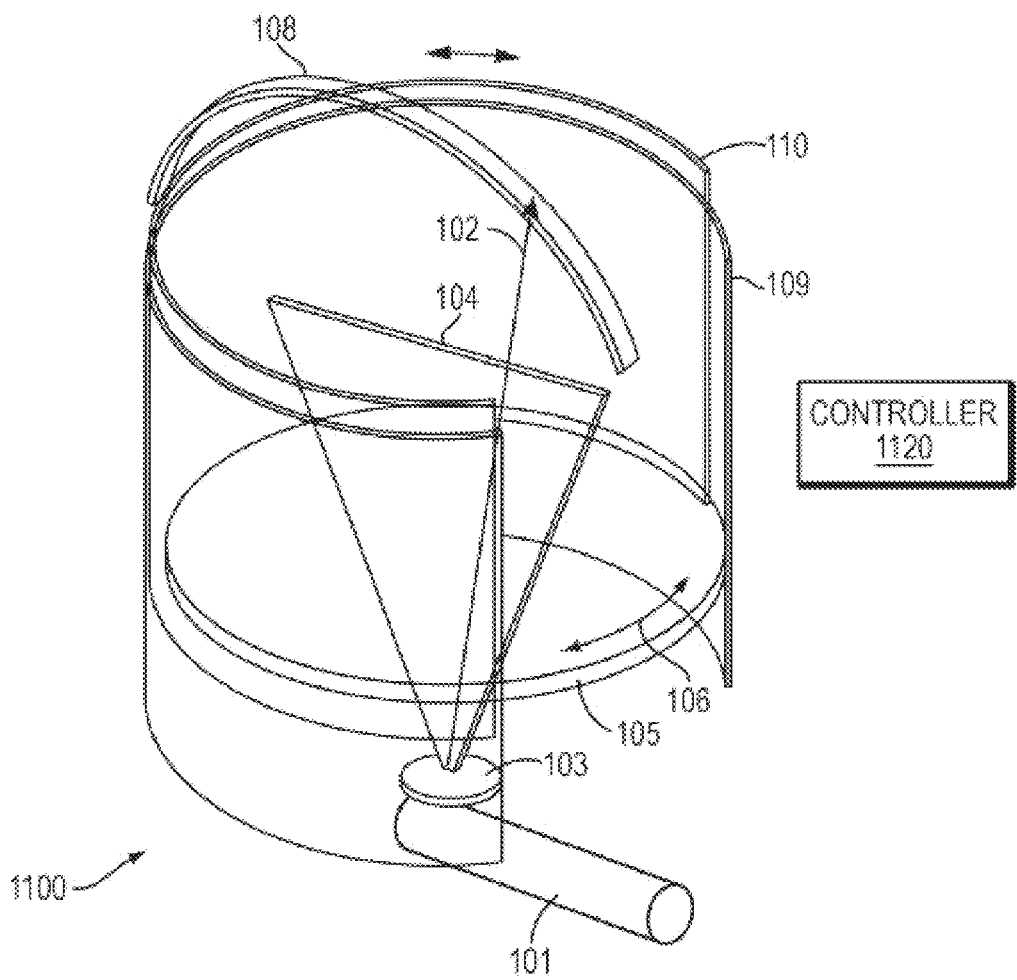
FIG. 11 is a schematic diagram of a single-view detector system in one embodiment.

FIG. 11 illustrates a single-view detector system 1100. The system 1100 may include some or all of the features of the system 50 described above including a controller 1120 for operating the system 1100 and generating images of the scanned object. In particular, the system 1100 includes a primary X-ray source 101, which produces a sweeping pencil beam 102 in conjunction with a rotating chopper wheel 103. Alternatively, the source 101 may produce a substantially vertical fan beam of radiation 104 without the use of chopper wheel 103. The object being scanned (not shown) may be placed on the rotating turntable 105, which may be made of a material such as carbon fiber to allow the X-rays in the beam to pass through it with minimal attenuation. The turntable 105 can be rotated in either direction as shown by arrow 106. A monolithic transmission detector 108 may intercept and detect the sweeping beam 102 that is transmitted through the object at each position of its sweep across the object, or in the case of a fan beam 104, transmission detector 108 includes a segmented array of individual detector elements that samples the transmitted intensity across the full field of view of the fan beam 104.

A combination of fixed 109 and movable 110 radiation shielding walls can prevent any appreciable radiation exposure to the environment during the scan (shielding on the top and the bottom of the system is not shown for purposes of clarity). The shielding walls 109, 110 can be configured to allow access for the object to be inserted prior to the scan on one side of the system 1100, and access for removing the object after the scan from the far side of the system, to aid in effective throughput of people and inspected items. Alternatively, the openings for insertion and removable of the object can be on the same side of the system.

Dual-View Scanning System

Figure 12:
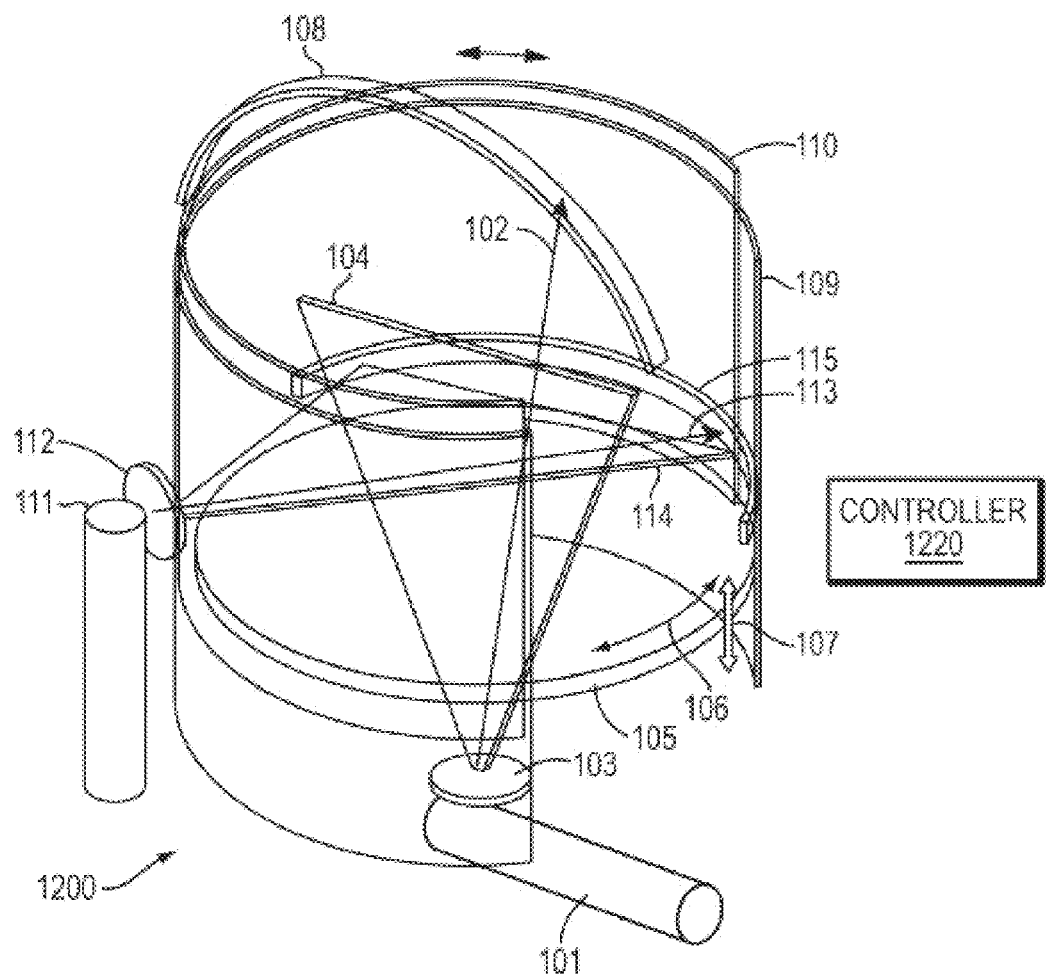
FIG. 12 is a schematic diagram of a dual-view detector system in one embodiment.

FIG. 12 illustrates a dual-view detector system 1200. The system 1100 may include some or all of the features of the systems 50, 1100 described above, including a controller 1220 for operating the system 1200 and generating images of the scanned object. In addition to the components shown in FIG. 11, the system 1200 may include a second x-ray source 111 with a second chopper wheel 112 to produce a sweeping beam in a substantially horizontal plane 114 that can be detected by a transmission detector 15.

Figure 13:
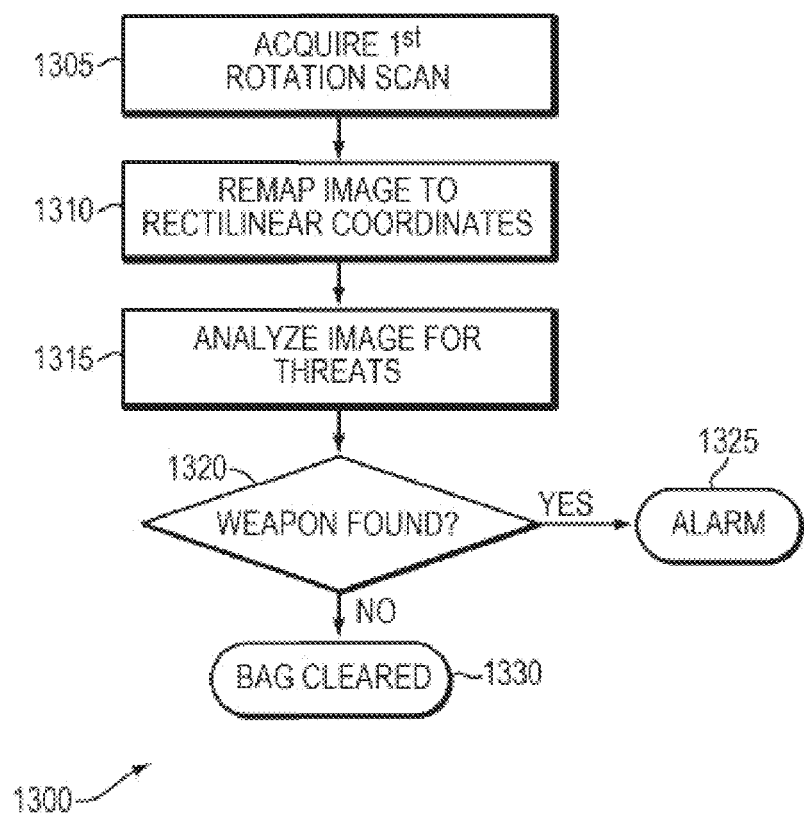
FIG. 13 is a flow diagram of a single-view detection process in one embodiment.

FIG. 13 is a flow diagram of a single-view detection process 1300. With reference to FIG. 12, using the primary X-ray source 101 and transmission detector 108, a full primary scan of the object (not shown) may involve at least a half-rotation of the turntable 105 through 180 degrees (1305). The resulting image data, being for example a set of radial scan lines, may then be remapped as described above to create a rectilinear two-dimensional transmission image of the object, such as the image shown in FIG. 6B (1310). An operator viewing the image, or the controller 1220 performing an image analysis (1315), may notice or detect the potential presence of a gun or other contraband item in the primary transmission image (1320). In response, the controller 1220 may issue an alarm (1325), and may order a secondary search of the bag for the suspect item. Otherwise, the controller 1220 may clear the object if no suspect item is found (1330).

Figure 14:
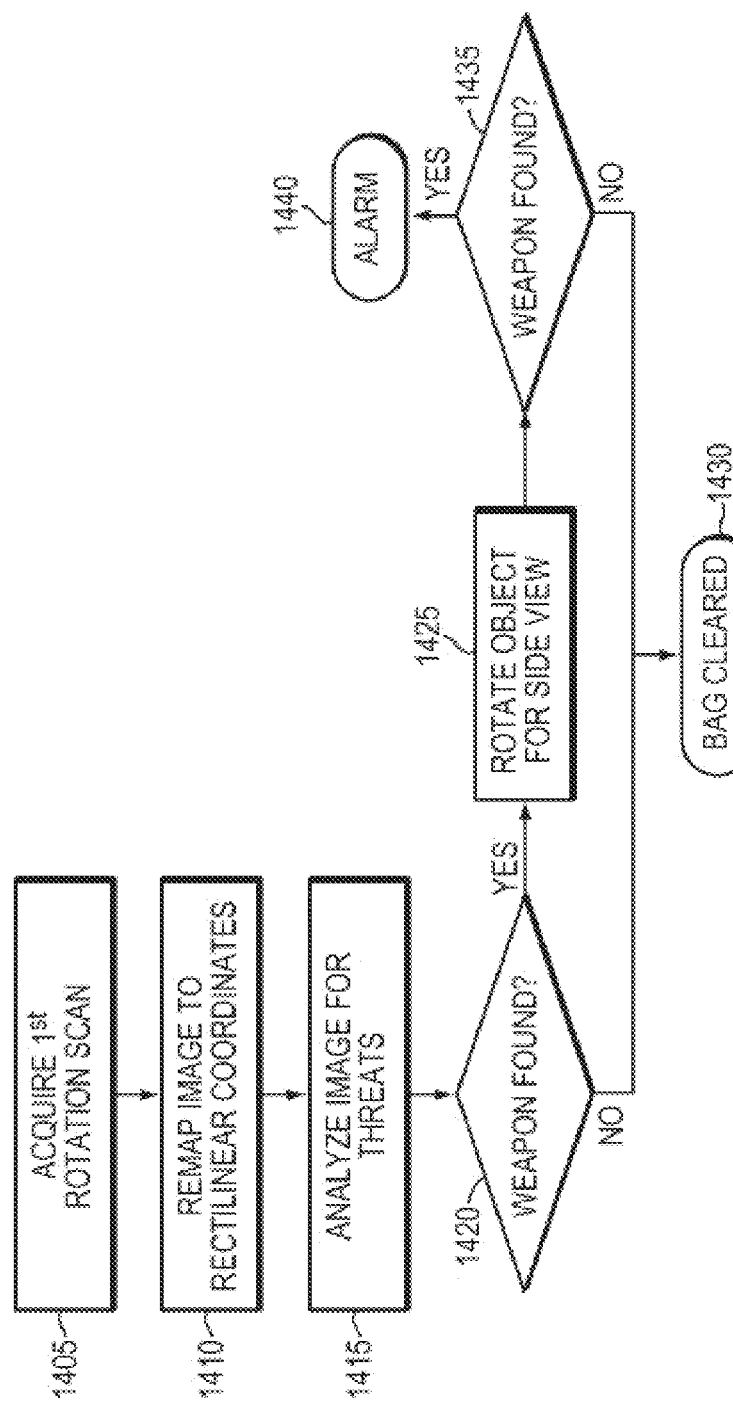
FIG. 14 is a flow diagram of dual-view detection process in one embodiment.

FIG. 14 is a flow diagram of a dual-view detection process 1400. Referring again to FIG. 12, the process 1400 may include an initial scan of the object as described above with reference to FIG. 13 (1405-1420). However, in response to a potential suspect item detection via the first rotational scan, the controller 1220 or operator may initiate a side-view scan of the object for verification purposes (1425-1435) before determining whether to raise an alarm (1440) or clear the object (1430). For example, the second X-ray source 111 in conjunction with a second chopper wheel 112 may create a pencil beam 113 that sweeps in a substantially horizontal plane. Alternatively, the second source 111 may produce a horizontal fan beam 114 without the use of chopper wheel 112.

The controller 1220, implementing an image analysis process (e.g., an automated algorithm or other method), may recognize suspicious regions of the image from the primary inspection image data that require further inspection, and, accordingly, initiate a side-view scan. As described above, the object may first be oriented to the optimal position prior to initiating the side-view scan by rotating turntable 105. For example, for regions characteristic of a concealed gun, the object (e.g., bag) may be rotated so that the long axis of the attenuated region in the primary scan is perpendicular to the direction of incidence of the side-view X-ray beam 113 or 114. The transmission detector 115 may intercept and detect the sweeping beam 113 transmitted through the inspected object at each position of its sweep across the object. In the alternate case of fan beam 114, the transmission detector 115 may include a segmented array of individual detector elements that samples the transmitted intensity across the full field of view of the fan beam 114. The inspected object is moved in the vertical direction through the beam as shown by arrow 107, for example via the use of a translational actuator (not shown) attached to the turntable. As the inspected object is translated through the plane of the beam 114, a full two-dimensional side-view transmission image of the object can be acquired.

Embodiments Utilizing Artificial Intelligence Algorithms or Other Methods

Automatic algorithms (including "Artificial Intelligence" or "AI") or other methods can be used to examine the primary and secondary X-ray transmission images to look for suspect items. This approach may greatly reduce the workload of the operators and allows for short inspection times and higher throughput. For example, most bags or inspected objects will not have suspicious regions in them that require a second side view scan. For these objects, only the primary scan may be needed to clear the object, which may require only a half-rotation of the object on the turntable. This scan can be achieved in a relatively short period of time, depending on the power of the X-ray source and the speed with which the beam is sweeping across the inspected object. The total inspection time is defined by the time required to position and remove the inspected item from system, and the actual scan time, which is likely to be no more than a few seconds. In the event that a side-view is required to clear the inspected object of suspicious items, an additional scan time of approximately 5 seconds may be required.

Backscatter Imaging Capability

Figure 15:
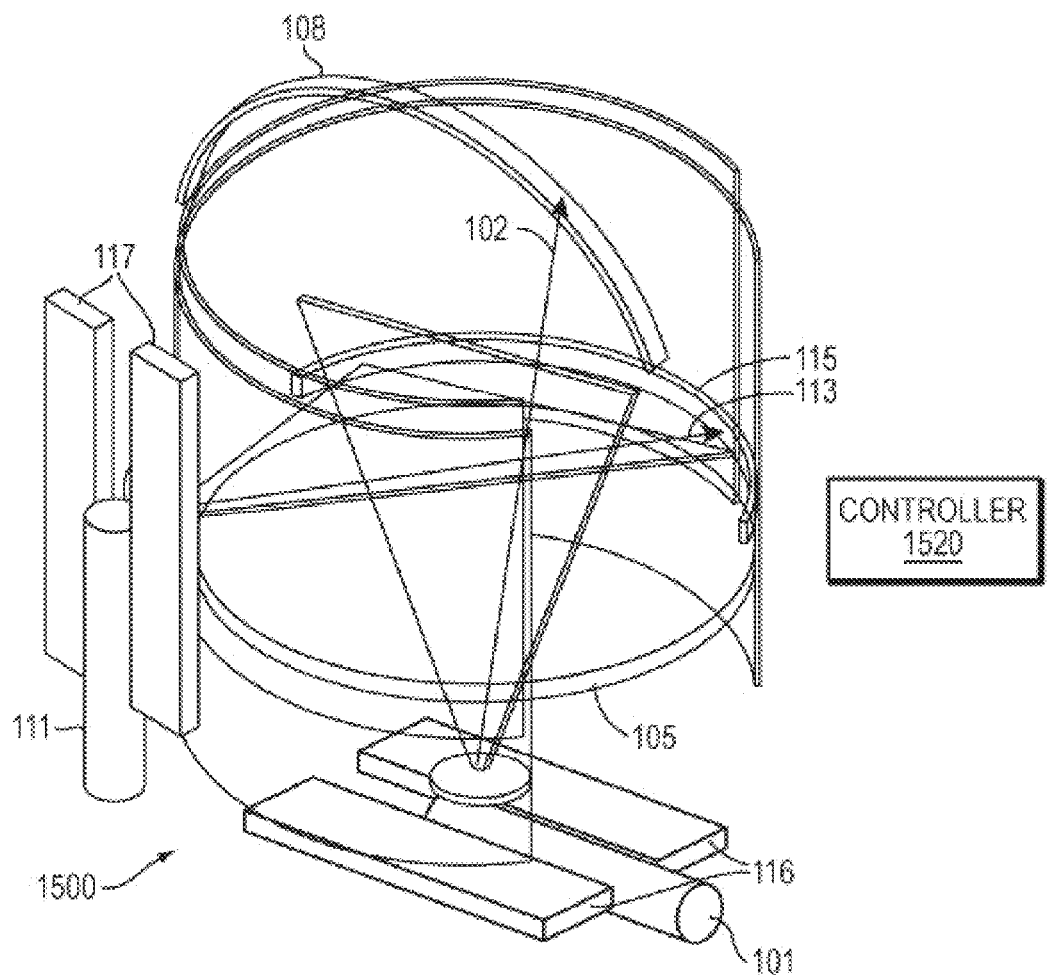
FIG. 15 is a schematic diagram of a dual-view detector system including backscatter detectors in one embodiment

FIG. 15 illustrates a dual-view detector system 1500 including backscatter detectors. The system 1500 may include some or all of the features of the system 1200 described above, including a controller 1520 for operating the system 1500 and generating images of the scanned object. In addition to the components shown in FIG. 12, the system 1500 may include backscatter detectors 116, 117 positioned near the X-ray sources 101, 111, respectively, enabling the system 1500 to acquire backscatter images of the object from backscatter radiation resulting from illumination of the object by the sweeping beams 102 and 113. In particular, the backscatter detectors 116 may be located under the turntable 105 on either side of the X-ray source 101 to detect X-rays backscattered from the sweeping beam 102, and the backscatter detectors 117 may be positioned at either side of the X-ray source 111 to detect X-rays backscattered from the sweeping beam 113.

The controller 1520 may acquire a backscatter image from the rotational primary scan by measuring the detected backscatter intensity in the scatter detectors 116 as a function of the position of sweeping beam 102 during its sweep across the inspection object. This process may be repeated for each rotational position of the turntable during its rotation through 180 degrees or more. The raw image may be a backscatter image containing radial scan lines, which as in the case of the primary rotational transmission image, may be remapped to create a two-dimensional rectilinear backscatter image that can be displayed to the operator, or be provided as input to the AI algorithms or other methods.

Similarly, the controller 1520 may acquire the backscatter image from the secondary side-view scan by measuring the detected backscatter intensity in scatter detectors 117 as a function of the position of sweeping beam 113 during its sweep across the inspection object. This process may be repeated for each translational position of the turntable through the plane containing sweeping beam 113, creating a two-dimensional backscatter image that can be displayed to the operator, or may be provided as further input to an automated image analysis process (e.g., AI) or other methods.

Computerized Tomography (CT) Reconstruction

Systems with side-view capability, such as the systems 1200 and 1500 described above, may be configured to acquire a Computerized Tomography (CT) reconstruction of the contents of the inspected object. A full three-dimensional reconstruction of the inspected object can be obtained if the turntable is rotated through at least 180 degrees (and optionally through 360 degrees) for each vertical translational position of the turntable, while acquiring transmission image data from the X-ray source 111 and the transmission detector 115. The two-dimensional slice through the inspected object defined by each translational position of the turntable can be reconstructed using a standard reconstruction method such as the Filtered Back-Projection (FBP). This method allows a two-dimensional map of the CT-number to be created for the slice, which shows the amount of X-ray attenuation which occurs in each voxel in the slice. By stacking these slices together for each translational position of the turntable, a three-dimensional map of the CT-number for the object can be created. By matching the CT number of suspect volumes to the expected CT-number of known organic threat materials such as explosives or narcotics, an automated alarm can be initiated to alert the operator to the potential presence of a threat material.

A limitation of the secondary CT reconstruction is the added time required to perform this process. If the turntable requires two seconds to complete a rotation, and a slice is desired every 1 cm along the height of a 30 cm inspection object, then the total scan time for the CT reconstruction may be approximately one minute. This additional time may be unacceptable, especially if many bags have potentially suspect items such as drink bottles or other liquids, which could potentially contain liquid explosives or mimic bulk explosives. One approach to minimize the time required for the CT reconstruction is to use one or both backscatter images to determine regions of the inspected object which contain highly scattering organic threat items that require further validation. The side-view backscatter image may be particularly useful in this regard, as it can inform the system as to which vertical slices of the bag contain the suspect item and require CT reconstruction. This allows the turntable to be raised to the correct height, and instead of reconstructing all slices in the inspected object, just those slices containing the suspect item can be reconstructed, substantially reducing the overall inspection time.

Figure 16:
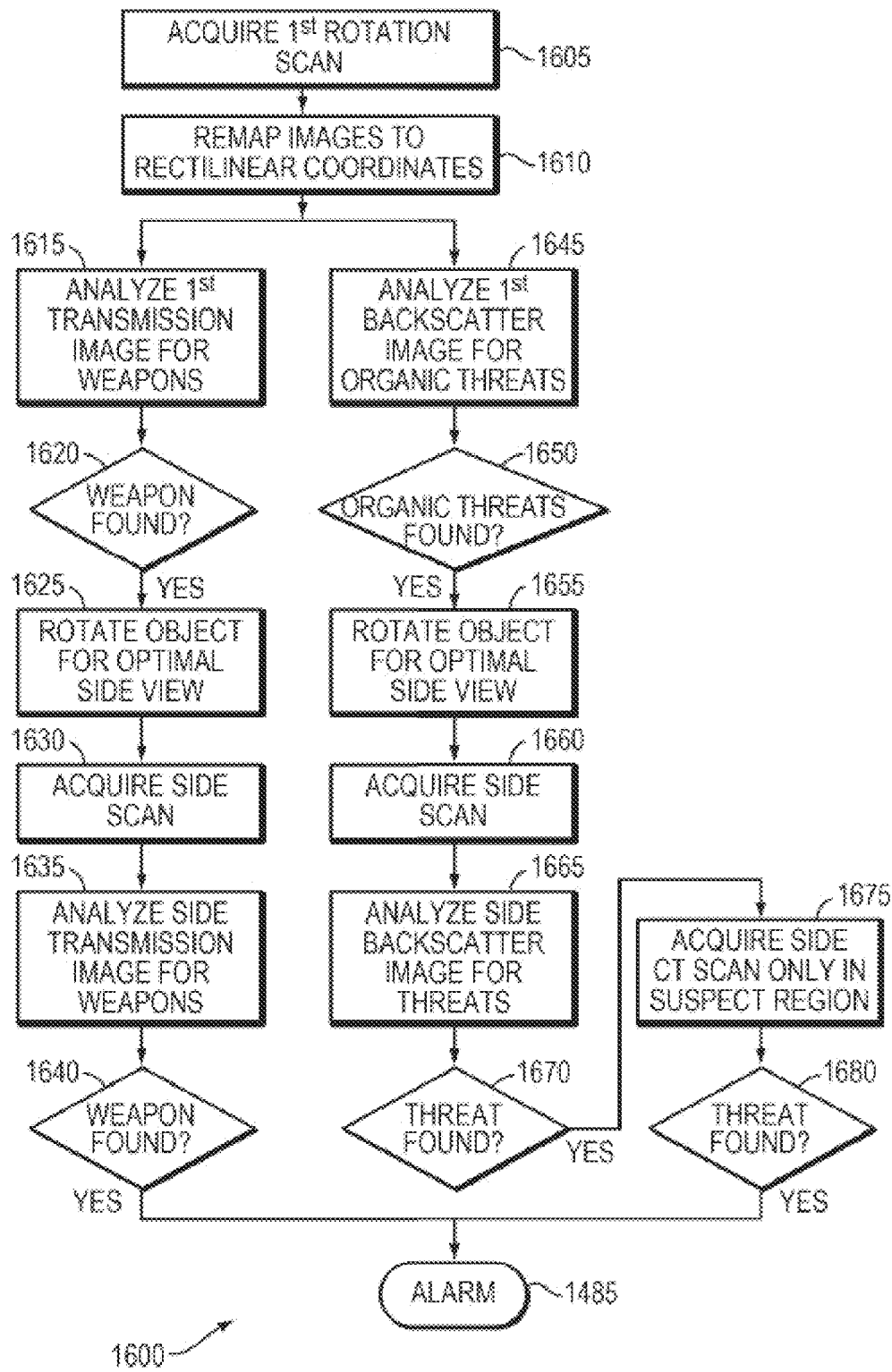
FIG. 16 is a flow diagram of a dual-view threat detection process with selective CT reconstruction in one embodiment.

FIG. 16 is a flow diagram of a dual-view threat detection process 1600 with selective CT reconstruction. The process 1600 enables imaging systems with side-view capability (e.g., systems 1200, 1500) to acquire a Computerized Tomography (CT) reconstruction of the contents of the inspected object. With reference to FIG. 15, using the primary X-ray source 101 and transmission detector 108, a full primary scan of the object (not shown) may involve at least a half-rotation of the turntable 105 through 180 degrees (1605). The resulting image data, being for example a set of radial scan lines, may then be remapped as described above to create a rectilinear two-dimensional transmission image of the object, such as the image shown in FIG. 6B (1610). An operator viewing the image, or the controller 1520 performing an image analysis (1615), may notice or detect the potential presence of a weapon or other suspect item in the primary transmission image (1620). In response to a potential suspect item detection via the first rotational scan, the controller 1520 or operator may initiate a side-view scan of the object for verification purposes (1625-1635) before determining whether a weapon is detected (1640) and raising an alarm accordingly (1685).

In parallel to the analysis of the transmission image, the controller 1520 may also perform a comparable analysis of the first backscatter image generated from the backscatter detectors 116 to determine the presence of suspect organic matter (1645-1650). If a potential threat is found, the controller 1520 or operator may initiate a side-view scan of the object to acquire and analyze a side backscatter image of the object (1455-1465). If the subsequent analysis confirms the presence of suspect organic matter (1670), the controller 1520 may then acquire a side CT scan that is limited to a region of the scanned volume containing the suspect organic matter (1675). If analysis of the CT scan confirms the presence of the suspect organic matter (1680), then the controller 1520 may raise an alarm accordingly (1485).

Dual-Energy Transmission Imaging

In example embodiments of the imaging systems described above, the transmission detectors 108 and 115 can have dual-energy capability, which allows them to characterize the energy of the transmitted X-rays incident on them. Instead of having only one data channel that indicates the total intensity of all the incident X-rays, a dual energy detector has two output data channels: one indicating the intensity of lower-energy X-rays, and another indicating the intensity of higher-energy X-rays. The difference between the strengths of the two signals provides information on the mean-energy of the transmitted beam, which is indicative of the material content of the items the beam has passed through before reaching the detector. A higher mean energy is indicative of metallic materials and these regions in the transmission image are colored blue. A lower mean energy is indicative of the presence of organic material and these regions are colored orange. Regions with intermediate mean energy are indicative of light metals such as aluminum, or regions where organic and metallic materials overlap along the beam path through the inspected object. These regions are colored green. The colorized transmission images can be displayed to the operator to assist in interpreting the contents of the bag (see the left transmission image in FIG. 3). Alternatively, or in addition, metallic regions can be used to provide additional information to a weapons-detection algorithm. Organic regions can be combined with any additional backscatter information to provide added information for determining which regions of the inspected object should undergo CT reconstruction to reduce overall inspection times.

For embodiments using fan beams 104 and 114, the transmission detector arrays 108 and 115 may include conventional sandwich-type scintillation detectors, which have a first array of elements sensitive to low energy X-rays, followed by a second array of elements sensitive to higher energy X-rays which have traversed the first array. An optional filter (such as copper) can be placed between the two arrays to enhance energy discrimination. For embodiments using sweeping beams 102 and 113, the transmission detectors can be of the type described in U.S. patent application Ser. No. 18/042,041, titled "X-Ray Detection Structure and System," which uses a single scintillator volume optically coupled to two layers of wavelength-shifting fibers. In addition, the transmission detectors can optionally utilize methods that have been described to enhance spatial resolution of the transmission image, such as the methods in the aforementioned application, and also described in PCT Patent Application No. PCT/US2022/081897, titled "Transmission Detector for X-Ray Imaging with Repeating Scintillator Structures."

Figure 17A:
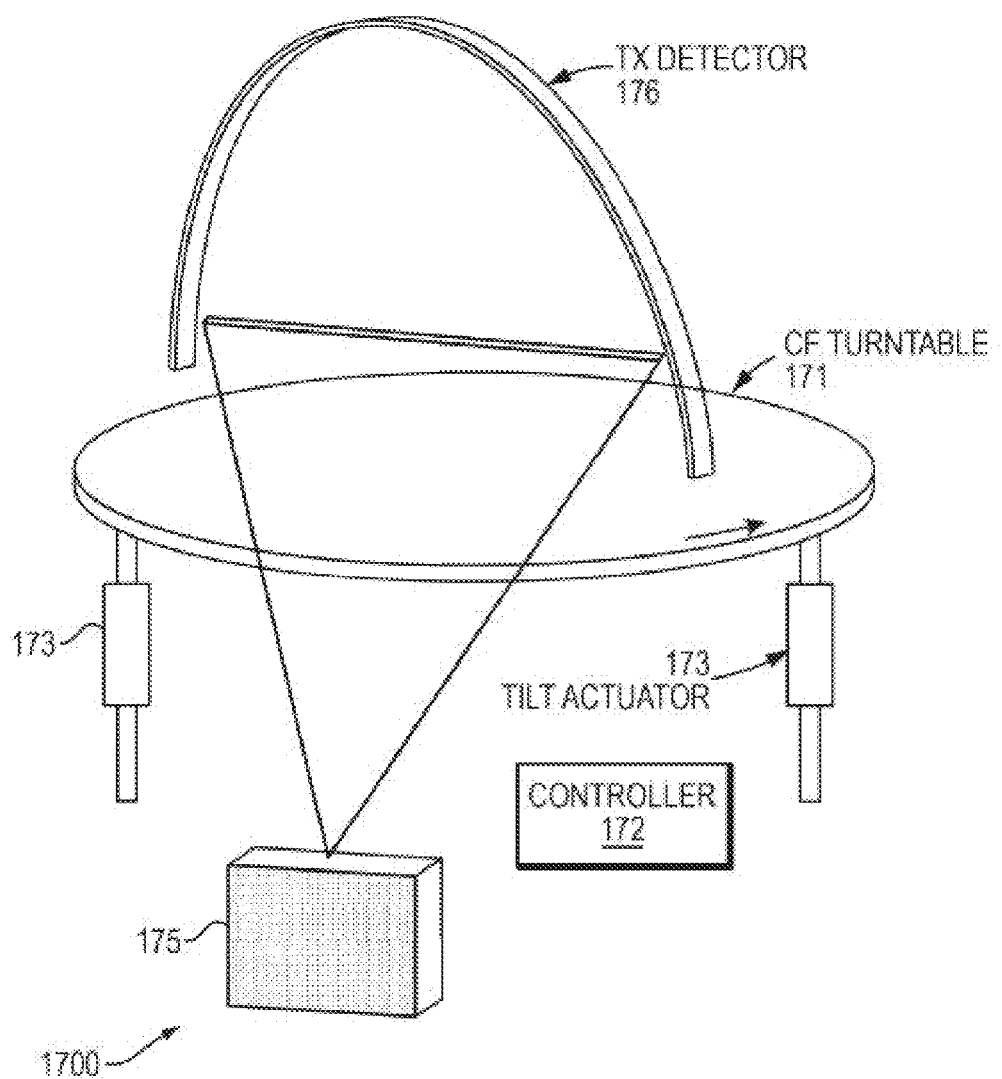
FIGS. 17A-B are diagrams of a single-view detector system including tilt actuation in one embodiment.
Figure 17B:
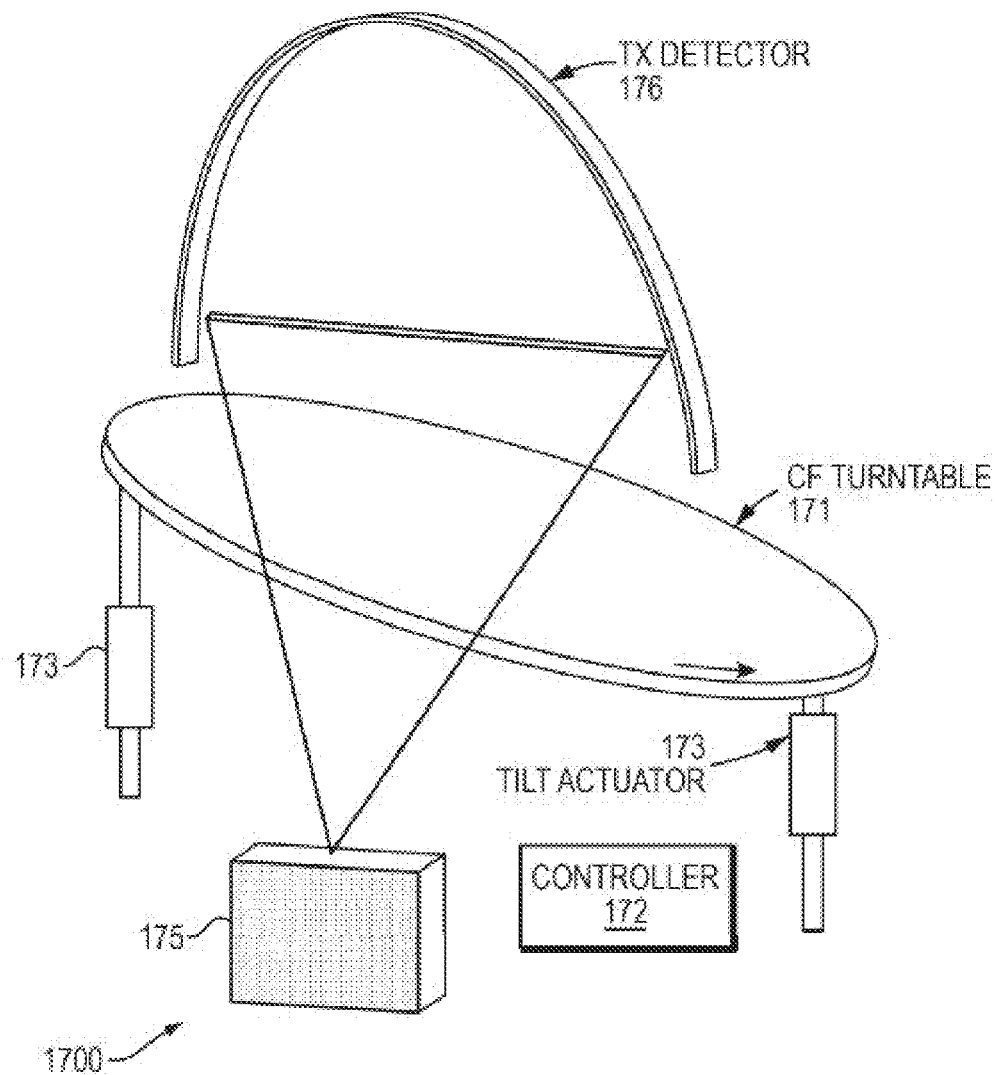

FIGS. 17A-B illustrate a single-view detector system 1700 including tilt actuation, the features of which may be incorporated into any of the systems described above. Likewise, the system 1700 may include some or all of the features of the systems described above, including a controller 172 for operating the system 1200 to generating images of the scanned object (not shown) on a turntable 171 via an X-ray source 175 and a transmission X-ray detector 176. In addition, the system 1700 may include one or more tilt actuators 173, which the controller 172 may operate to expand or contract and thereby tilt the turntable 171 and the object being scanned. By tilting the object relative to the X-ray beam(s), the system 1700 may provide a more advantageous viewing angle for suspect items. FIG. 17A illustrates the system 1700 in a flat or non-tilted position, while FIG. 17B illustrated the system 1700 in a tilted position, whereby the X-ray output by the source 175 passes through the turntable (and, thus, the object) at a different angle to capture a different view of the object. In an example scanning process, the controller 172 may perform a plurality of scans of the object while the turntable 171 is in a non-tilted position and in one or more different tilted positions.

FIGS. 18A-C are example images of a gun obtained by the system 1700. In each figure, a top image is a side-view rendering of the gun, and the bottom image is an image generated by the system 1700. FIG. 18A, at top, shows a gun lying flat in the rotational plane, allowing the system to acquire a clear image of the gun as shown at bottom. In FIG. 18B, however, the gun is positioned vertically within the object, thereby resulting in an image that does not clearly depict the gun. In response to obtaining such an image, or in a preconfigured process, the controller 172 may tilt the object about the vertical axis (Z-axis) by 25° such that the gun is titled relative to the side view as shown at the top of FIG. 18C. Upon a subsequent scan at this angle, the generated image shown at the bottom of FIG. 18C depicts the gun with sufficient clarity to be identified by an operator or by the controller 172 operating an image analysis process as described above. FIGS. 18D-E are comparable to FIGS. 18B-C, but show the imaging result of the system 1700 tilting the object by 35°, thereby producing an even clearer view of the gun as shown at the bottom of FIG. 18E. An example scanning process by the system 1700 may perform multiple scans at a combination of different tilt angles and rotational angles. The given tilt and rotational angles may be predetermined values of a configured scanning process, or may be determined by the controller 172 in response to an automated analysis of previously-acquired images of the object, thereby determining optical angles at which to view suspect items within the object. Thus, with only one x-ray source below the object being inspected, the system 1700 is able to provide some of the benefits of the second side view produced by the previously described dual-source systems.

Figure 19:
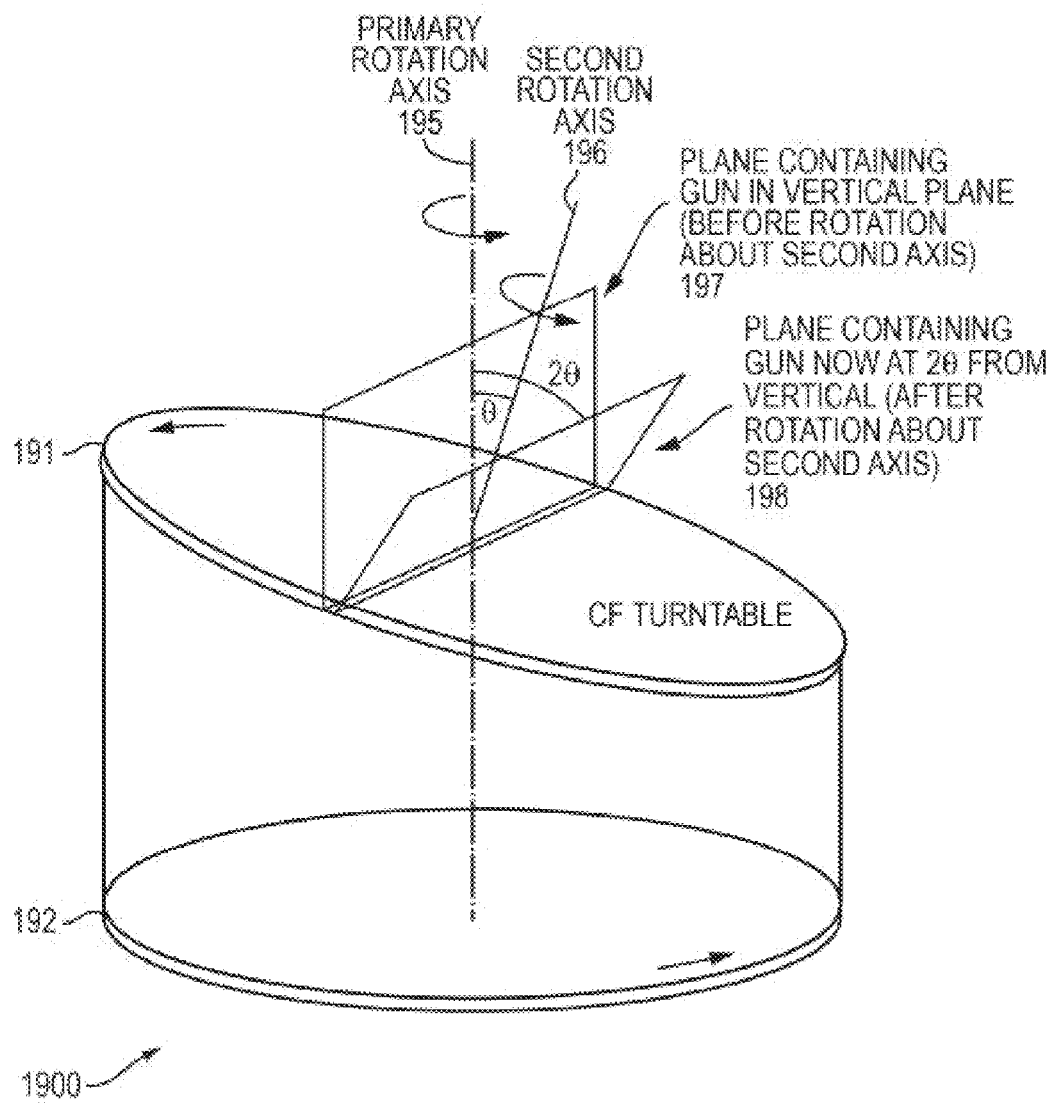
FIG. 19 is a diagram of a turntable assembly in a further embodiment.

FIG. 19 is a diagram of a turntable assembly 1900 that may be implemented in any of the systems described above. The assembly 1900 includes a turntable 191 that is fixed at an angle that is offset from the vertical axis (primary rotation axis 195), and is orthogonal to a second rotation axis 196 that is oriented at an angle θ (for example, 25°) to the primary axis 195. If a suspect item such as a gun is standing in the vertical plane 197 during a first rotational scan about the primary rotation axis 195, a second rotation by 180 degrees of the turntable 191 about the second axis 196 will now position the gun within a plane 198 that is at an angle 2θ (for example, 50°) from the vertical plane 197. The system may then perform a second rotational scan about the primary axis 195, thereby generating a substantially different view of the suspect item that may enhance identification of the item. Optionally, a support plate 192 may be coupled to the turntable 191 and positioned orthogonal to the primary rotation axis 195. The support plate 192 may be rotated about the primary rotation axis 195 to cause the turntable to rotate about the primary rotation axis 195, while also enabling the turntable to rotate about the second rotation axis 196 independent of the support plate 192.

The vertical axis may be a first rotation axis, and the top surface of the turntable may be tilted away from the vertical axis and be orthogonal to a second rotational axis. The controller may rotate the object about the second axis and cause the X-ray detector to obtain subsequent image data of the object.

In view of the above disclosure, and in reference to the drawings, it will be understood that in an embodiment, an X-ray inspection system includes: a turntable configured to rotate an object placed thereon with a rotation about a substantially vertical rotation axis; an X-ray source module configured to output an X-ray beam oriented in a substantially vertical plane to intersect the object placed on the turntable; and a detector configured to detect X-rays from the X-ray beam that are transmitted through the object during the rotation.

This embodiment can further include any of the features illustrated in the drawings, described above in relation to other embodiments, or listed in the claims hereinafter.

In further view of the above disclosure, and in reference to the drawings, it will be understood that in another embodiment, an X-ray inspection method includes: rotating an object about a substantially vertical rotation axis; and detecting X-rays transmitted through the object during the rotating the object, the X-rays being from an X-ray beam oriented in a substantially vertical plane. This embodiment method also can further incorporate any of the features illustrated in the drawings, described above in relation to other embodiments, or listed in the claims hereinafter.

While example embodiments have been particularly shown and described, it will be understood by those skilled in the art that various changes in form and details may be made therein without departing from the scope of the embodiments encompassed by the appended claims.

What is claimed is:

1. A system for inspecting an object, comprising:
    a turntable configured to have the object placed thereon and to rotate the object about a first rotation axis;
    an X-ray source configured to generate an X-ray beam in a plane to intersect with the object;
    an X-ray detector configured to detect at least a portion of the X-ray beam transmitted through the object during rotation and generate image data based on the detected X-ray beam; and
    a controller configured to:
        generate an image of the object based on the image data;
        determine, based on a suspect item identified in the image of the object, a second rotation axis at an angle from the first rotation axis;
        cause a tilt mechanism to tilt the turntable to be perpendicular to the second rotation axis; and
        initiate a subsequent rotation of the object about the second rotation axis.

2. The system of claim 1, wherein the X-ray beam is a fan beam.

3. The system of claim 2, wherein the X-ray detector includes a segmented detector array configured to detect the transmitted portion of the X-ray beam.

4. The system of claim 1, wherein the X-ray beam is a sweeping pencil beam.

5. The system of claim 4, wherein the X-ray detector includes a non-segmented monolithic detector configured to detect the transmitted portion of the X-ray beam.

6. The system of claim 1, wherein the turntable is configured to rotate the object through at least 180 degrees.

7. The system of claim 1, wherein the X-ray beam in the plane is in a substantially vertical plane, the X-ray source is a first X-ray source, the X-ray beam is a first X-ray beam, and the X-ray detector is a first X-ray detector, and further comprising:
 a second X-ray source configured to generate a second X-ray beam in a plane substantially orthogonal to the substantially vertical plane; and
 a second X-ray detector configured to detect at least a portion of the second X-ray beam transmitted through the object during rotation.

8. The system of claim 7, wherein the turntable is further configured to translate the object vertically as the second X-ray source generates a second X-ray beam.

9. The system of claim 1, wherein the controller is configured to determine the angle of the second rotation axis based on a target angle to obtain a side view of the suspect item within the object.

10. The system of claim 1, further comprising at least one backscatter detector configured to detect scattered radiation from the X-ray beam.

11. The system of claim 1, wherein the turntable is substantially transparent to X-rays.

12. The system of claim 1, wherein the controller is configured to translate the turntable along a substantially vertical direction.

13. The system of claim 12, wherein the transmitted X-rays from the X-ray beam are detected during both rotation and translation of the object.

14. The system of claim 13, wherein the controller is further configured to reconstruct contents of the object via at least one Computerized Tomography (CT) algorithm.

15. The system of claim 1, wherein the controller is further configured to:
 identify a suspect region of the image; and
 confine a subsequent scan of the object to a subset of the object including the suspect region.

16. The system of claim 15, wherein the controller is further configured to identify the suspect region based on a backscatter image of the object.

17. The system of claim 1, wherein the controller is further configured to generate the image of the object by mapping the image data onto rectilinear coordinates.

18. A system for inspecting an object, the system comprising:
 a turntable configured to receive placement of the object thereon;
 a support coupled to the turntable and configured to rotate the object on the turntable, about a substantially vertical axis, to perform first and second rotational X-ray scans of the object; and
 an X-ray source configured to generate an X-ray beam to intersect the object during the first and second rotational X-ray scans for X-ray inspection of the object,
 wherein the turntable is further configured to rotate the object, between the first and second rotational X-ray scans, about an offset rotation axis that is offset at an angle from the substantially vertical axis.

19. The system of claim 18, further comprising an X-ray detector configured to detect a portion of the X-ray beam that is transmitted through the object during the first and second rotational X-ray scans and to generate image data based on the detected portion of the X-ray beam.

20. The system of claim 19, further comprising a controller configured to generate an image of the object based on the image data.

21. The system of claim 20, wherein the controller is further configured, responsive to
 identification of a suspect item in the image of the object, to cause the turntable to rotate the object and to
 initiate the second rotational X-ray scan.

22. The system of claim 20, wherein the controller is further configured to:
 identify, based on the image of the object, a suspect region of the object; and
 confine the second rotational X-ray scan to inspect a subset of the object including the suspect region.

23. The system of claim 22, wherein the controller is further configured to identify the suspect region based further on a backscatter image of the object.

24. The system of claim 18, wherein the X-ray beam is in a substantially vertical plane.

25. The system of claim 18, wherein the support is a support plate.

26. The system of claim 18, wherein the X-ray beam is a fan beam.

27. The system of claim 18, wherein the X-ray beam is a sweeping pencil beam.

28. The system of claim 18, wherein the support is configured to rotate the object on the turntable through at least 180 degrees.

29. A method for inspecting an object, the method comprising:
 rotating, about a substantially vertical axis, using a support, a turntable having the object placed thereon to perform first and second rotational X-ray scans of the object;
 generating an X-ray beam to intersect the object during the first and second rotational X-ray scans for X-ray inspection of the object; and
 rotating the object, between the first and second rotational X-ray scans, about an offset rotation axis that is offset at an angle from the substantially vertical axis.

* * * * *